(12) United States Patent
Dobbie

(10) Patent No.: US 11,100,700 B2
(45) Date of Patent: Aug. 24, 2021

(54) SYSTEM AND METHOD FOR RENDERING A GRAPHICAL SHAPE

(71) Applicant: Will Dobbie, Sunnyvale, CA (US)

(72) Inventor: Will Dobbie, Sunnyvale, CA (US)

(*) Notice: Subject to any disclaimer, the term of this patent is extended or adjusted under 35 U.S.C. 154(b) by 0 days.

(21) Appl. No.: 16/641,961

(22) PCT Filed: Aug. 28, 2018

(86) PCT No.: PCT/IB2018/056539
§ 371 (c)(1),
(2) Date: Feb. 25, 2020

(87) PCT Pub. No.: WO2019/043564
PCT Pub. Date: Mar. 7, 2019

(65) Prior Publication Data
US 2020/0320779 A1 Oct. 8, 2020

(30) Foreign Application Priority Data
Aug. 28, 2017 (AU) ................................ 2017903462

(51) Int. Cl.
*G06T 15/40* (2011.01)
*G06T 15/00* (2011.01)
(52) U.S. Cl.
CPC .......... *G06T 15/405* (2013.01); *G06T 15/005* (2013.01)
(58) Field of Classification Search
None
See application file for complete search history.

(56) References Cited

U.S. PATENT DOCUMENTS

| 6,441,816 B1* | 8/2002 | Nguyen | G06T 15/04 345/420 |
| 8,553,032 B1 | 10/2013 | Poston | |
| 2005/0212806 A1* | 9/2005 | Koselj | G06T 11/203 345/522 |
| 2006/0132495 A1* | 6/2006 | Anderson | G06T 11/203 345/581 |
| 2007/0070071 A1* | 3/2007 | Terazono | G06T 9/20 345/467 |

(Continued)

OTHER PUBLICATIONS

International Search Report and Written Opinion dated Feb. 1, 2019 in PCT Application No. PCT/IB2018/056539.

(Continued)

*Primary Examiner* — James A Thompson
(74) *Attorney, Agent, or Firm* — Haynes annd Boone, LLP

(57) ABSTRACT

A method comprising computing a plurality of curved, wherein the curved lines correspond to a boundary of a graphical shape, computing buffers, and subdividing the curved lines to form a plurality of monotonic curved lines, computing a polygon for each curved line, wherein each polygon covers a line segment, calculating a signed distance for each pixel between the pixel and a point on the line segment extending across the relevant polygon that is closest to the pixel, reading from the buffer a stored signed distance for the relevant pixel and if the signed distance is less than the stored signed distance, writing the signed distance to the distance buffer, using the one or more signed distances to calculate one or more blending factors and using the one or more blending factors to blend the polygon thereby rendering the graphical shape.

15 Claims, 9 Drawing Sheets

(56) References Cited

U.S. PATENT DOCUMENTS

| | | |
|---|---|---|
| 2007/0097123 A1 | 5/2007 | Loop et al. |
| 2010/0241382 A1 | 10/2010 | Kato et al. |
| 2011/0273454 A1* | 11/2011 | Zimmer ................ G09G 5/243 |
| | | 345/469.1 |
| 2014/0043339 A1 | 2/2014 | Taylor et al. |
| 2016/0364892 A1* | 12/2016 | Huang .................... G06K 9/52 |
| 2018/0300858 A1* | 10/2018 | Chen .................... G06T 15/503 |

OTHER PUBLICATIONS

Lengyel, Eric. "GPU-Centered Font Rendering Directly from Glyph Outlines" Journal of Computer Graphics Techniques, vol. 6, No. 2, pp. 31-47, Jun. 2017.

* cited by examiner

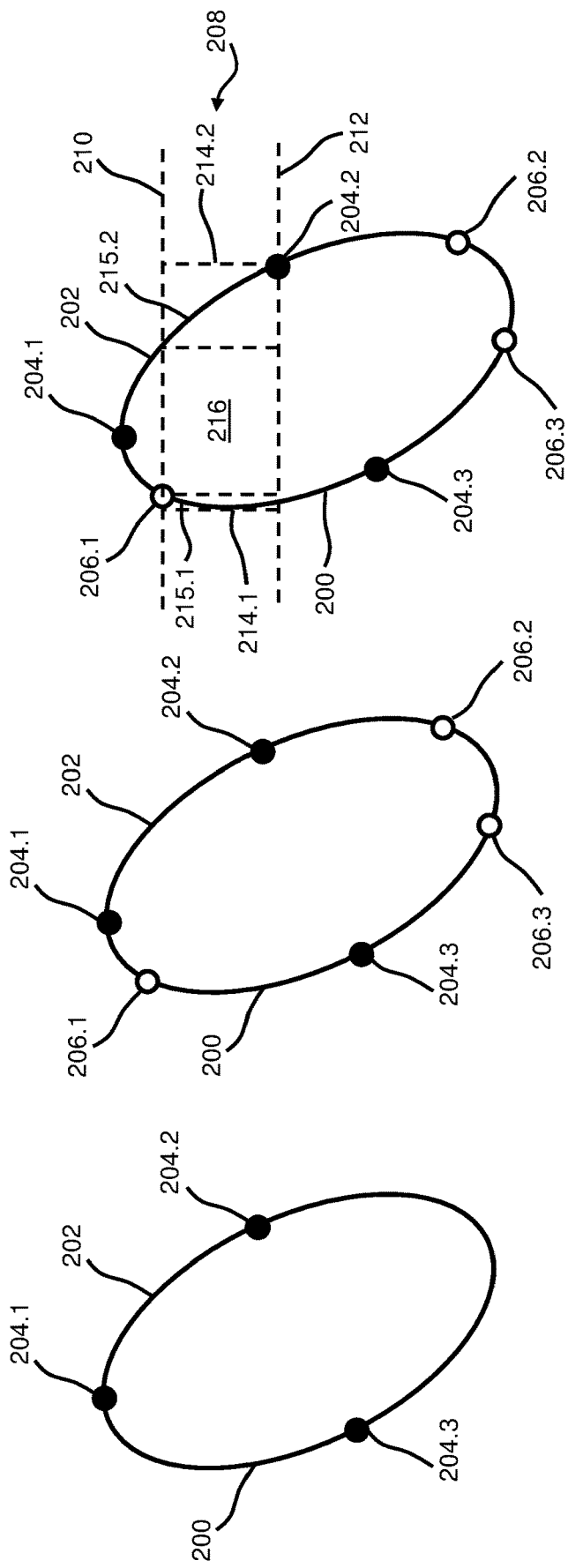

SYSTEM AND METHOD FOR RENDERING A GRAPHICAL SHAPE

RELATED APPLICATIONS

The present application is a United States National Phase under 35 U.S.C. § 371 of International Application No. PCT/IB2018/056539, entitled "SYSTEM AND METHOD FOR RENDERING A GRAPHICAL SHAPE" and filed on Aug. 28, 2018, which claims priority to, and the benefit of, Australian Patent Application No. 2017903462, filed on Aug. 28, 2017, the entire disclosures of both of which are hereby incorporated by reference herein.

FIELD

The present invention relates to a system and method for rendering a graphical shape.

BACKGROUND

Graphical shapes are rendered on computer visual displays for a variety of purposes, including for implementing application program user interfaces and for displaying modelled and simulated data.

Three-dimensional graphics are often rendered in real-time by computer systems using a graphics processor unit (GPU). A GPU is a specialised electronic circuit that rapidly processes three-dimensional graphics data and accelerates the creation of image data to a render buffer for subsequent display.

Rendering techniques that are adapted for use with GPUs suffer from several problems. In particular, they cannot be used to render efficiently sets of graphical shapes that intersect or that change position and orientation each frame. Further, antialiasing methods that are used with these techniques for vector-based graphics are highly inefficient.

In this context, there is a need for improved rendering techniques.

SUMMARY

According to the present invention, there is provided a method comprising:

computing a plurality of curved lines in screen coordinates, wherein the curved lines correspond to a boundary of a graphical shape;

computing a distance buffer and a render buffer, wherein the buffers have identical dimensions and an identical camera position;

subdividing the curved lines to form a plurality of monotonic curved lines;

for each vertex of the monotonic curved lines:
determining a subjacent vertex of the monotonic curved lines that is immediately below the relevant vertex;
determining a row disposed between the relevant vertex and the subjacent vertex;
computing a plurality of first quads, wherein each of the first quads covers a line segment of one of the monotonic curved lines that extends across the row;
computing one or more second quads, wherein each of the second quads is disposed inside the boundary of the graphical shape and between a pair of the first quads; and horizontally feathering each side of each of the first quads by an antialiasing distance, wherein the relevant side faces one of the second quads;
for each pixel of each of the first quads:
calculating a signed distance between the relevant pixel and a point on the line segment extending across the relevant first quad that is closest to the relevant pixel;
reading from the distance buffer a stored signed distance for the relevant pixel; and
if the signed distance is less than the stored signed distance, writing the signed distance to the distance buffer;

for each pixel of each of the second quads, writing a maximum negative signed distance to the distance buffer;
rendering the first and second quads to the render buffer;
reading one or more signed distances from the distance buffer corresponding to the first and second quads;
using the one or more signed distances to calculate one or more blending factors; and
using the one or more blending factors to blend the first and second quads in the render buffer thereby rendering the graphical shape.

The method may further comprise computing a plurality of distance buffers corresponding to a plurality of graphical shapes, iterating through the graphical shapes in z-order, assigning the graphical shapes to the distance buffers so that each of the distance buffers only comprises graphical shapes that do not overlap, or that overlap and comprise a common fill shader, and rendering the graphical shapes to the render buffer.

The method may further comprise performing a geometric operation on each set of overlapping graphical shapes before assigning the set of overlapping graphical shapes to the relevant distance buffer.

The geometric operation may comprise a union operation.

The geometric operation may comprise an intersection operation.

The curved lines may comprise Bézier curves.

The curved lines may comprise cubic or quadratic Bézier curves.

The signed distances for the first quads may be calculated using a cubic equation.

The one or more blending factors may be calculated using a sigmoid shaped curve.

The method may be executed on a graphics processor unit.

The method may be executed in real-time.

The method may be executed in real-time on a graphics processor unit.

The present invention also provides a method comprising:
computing a plurality of line segments in screen coordinates, wherein the line segments correspond to a boundary of a graphical shape;
computing a distance buffer and a render buffer, wherein the buffers have identical dimensions and an identical camera position;
computing a plurality of lines and triangles, wherein each of the lines and triangles covers a line segment;
extruding each line and triangle by an antialiasing distance into a polygon covering the line segment; and
for each pixel of each polygon:
calculating a signed distance between the relevant pixel and a point on the line segment extending across the relevant polygon that is closest to the relevant pixel;
reading from the distance buffer a stored signed distance for the relevant pixel; and
if the signed distance is less than the stored signed distance, writing the signed distance to the distance buffer;
rendering each polygon in the render buffer;

reading one or more signed distances from the distance buffer corresponding to the polygon;

using the one or more signed distances to calculate one or more blending factors; and using the one or more blending factors to blend the polygon in the render buffer thereby rendering the graphical shape.

The present invention also provides a system for rendering a graphical shape, the system comprising a graphics processor unit configured to:

compute a plurality of curved lines in screen coordinates, wherein the curved lines correspond to a boundary of a graphical shape;

compute a distance buffer and a render buffer, wherein the buffers have identical dimensions and an identical camera position;

subdivide the curved lines to form a plurality of monotonic curved lines;

for each vertex of the monotonic curved lines:

determine a subjacent vertex of the monotonic curved lines that is immediately below the relevant vertex;

determine a row disposed between the relevant vertex and the subjacent vertex;

compute a plurality of first quads, wherein each of the first quads covers a line segment of one of the monotonic curved lines that extends across the row;

compute one or more second quads, wherein each of the second quads is disposed inside the boundary of the graphical shape and between a pair of the first quads; and horizontally feather each side of each of the first quads by an antialiasing distance, wherein the relevant side faces one of the second quads;

for each pixel of each of the first quads:

calculate a signed distance between the relevant pixel and a point on the line segment extending across the relevant first quad that is closest to the relevant pixel;

read from the distance buffer a stored signed distance for the relevant pixel; and if the signed distance is less than the stored signed distance, write the signed distance to the distance buffer;

for each pixel of each of the second quads, write a maximum negative signed distance to the distance buffer;

render the first and second quads to the render buffer;

read one or more signed distances from the distance buffer corresponding to the first and second quads;

use the one or more signed distances to calculate one or more blending factors; and use the one or more blending factors to blend the first and second quads in the render buffer thereby rendering the graphical shape.

The present invention also provides a computer-readable medium storing computer-executable instructions, comprising:

computing a plurality of curved lines in screen coordinates, wherein the curved lines correspond to a boundary of a graphical shape;

computing a distance buffer and a render buffer, wherein the buffers have identical dimensions and an identical camera position;

subdividing the curved lines to form a plurality of monotonic curved lines;

for each vertex of the monotonic curved lines:

determining a subjacent vertex of the monotonic curved lines that is immediately below the relevant vertex;

determining a row disposed between the relevant vertex and the subjacent vertex;

computing a plurality of first quads, wherein each of the first quads covers a line segment of one of the monotonic curved lines that extends across the row;

computing one or more second quads, wherein each of the second quads is disposed inside the boundary of the graphical shape and between a pair of the first quads; and horizontally feathering each side of each of the first quads by an antialiasing distance, wherein the relevant side faces one of the second quads;

for each pixel of each of the first quads:

calculating a signed distance between the relevant pixel and a point on the line segment extending across the relevant first quad that is closest to the relevant pixel;

reading from the distance buffer a stored signed distance for the relevant pixel; and if the signed distance is less than the stored signed distance, writing the signed distance to the distance buffer;

for each pixel of each of the second quads, writing a maximum negative signed distance to the distance buffer;

rendering the first and second quads to the render buffer;

reading one or more signed distances from the distance buffer corresponding to the first and second quads;

using the one or more signed distances to calculate one or more blending factors; and using the one or more blending factors to blend the first and second quads in the render buffer thereby rendering the graphical shape.

BRIEF DESCRIPTION OF DRAWINGS

Embodiments of the invention will now be described by way of example only with reference to the accompanying drawings, in which:

FIGS. 2(a) to 2(c) illustrate steps comprised in the method;

DESCRIPTION OF EMBODIMENTS

Figure 1:
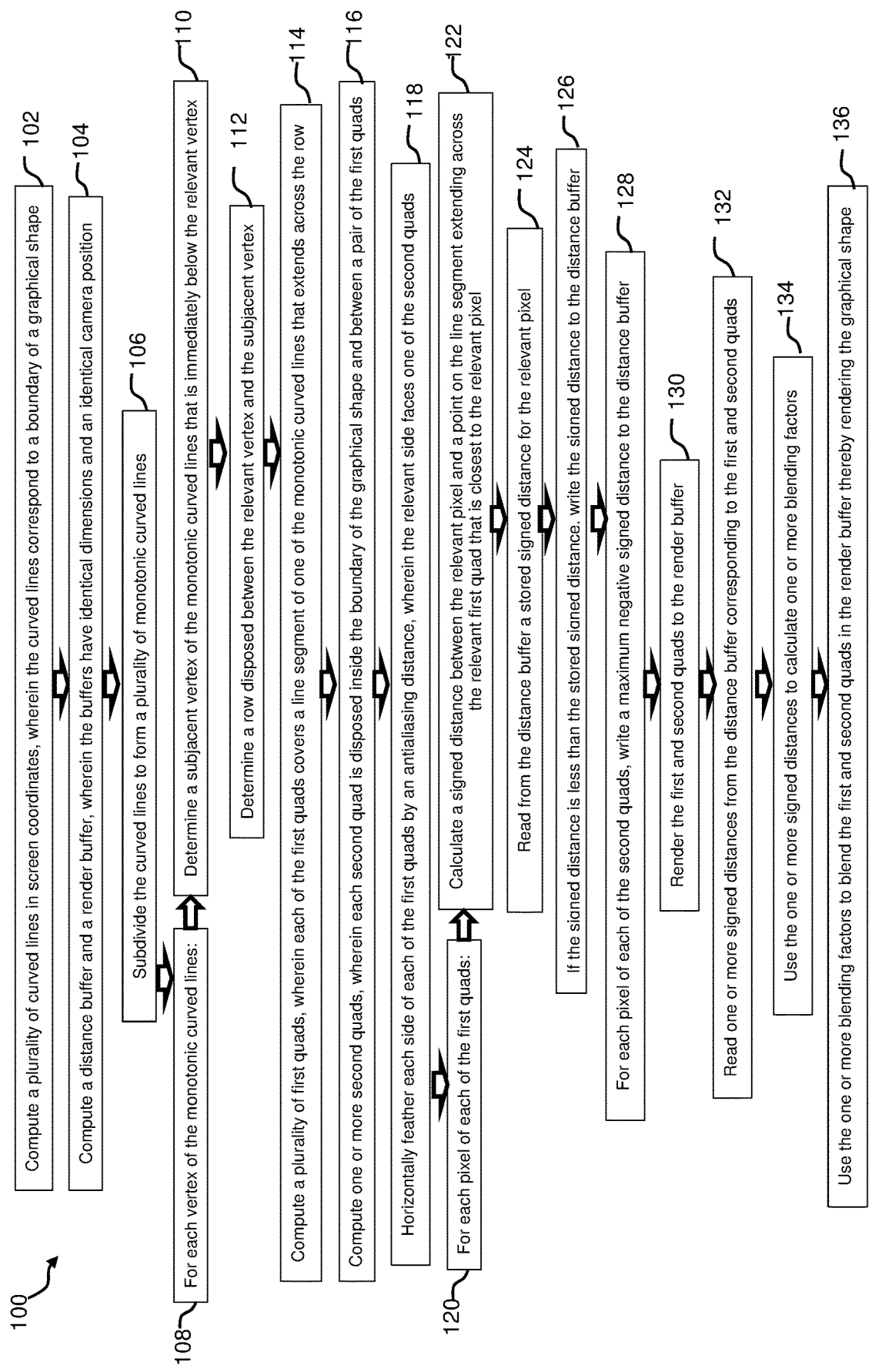
FIG. 1 is a flowchart of a method for rendering a graphical shape according to an example embodiment of the invention.

Referring to the drawings, example embodiments of the present invention provide a method 100 for rendering a graphical shape. The operations of the method 100 may be implemented by one or more software modules. The one or more software modules may be embodied in a non-transitory computer-readable medium storing computer-executable instructions for performing the operations of the method.

Referring to FIG. 1, the method 100 comprises computing a plurality of curved lines in screen coordinates, wherein the curved lines correspond to a boundary of a graphical shape 102, computing a distance buffer and a render buffer, wherein the buffers have identical dimensions and an identical camera position 104 and subdividing the curved lines to form a plurality of monotonic curved lines 106.

The method further comprises, for each vertex of the monotonic curved lines 108, determining a subjacent vertex of the monotonic curved lines that is immediately below the relevant vertex 110, determining a row disposed between the relevant vertex and the subjacent vertex 112, computing a plurality of first quads, wherein each of the first quads covers a line segment of one of the monotonic curved lines that extends across the row 114, computing a plurality of second quads, wherein each of the second quads is disposed inside the boundary of the graphical shape and between a pair of the first quads 116 and horizontally feathering each side of each of the first quads by an antialiasing distance, wherein the relevant side faces one of the second quads 118.

The method further comprises, for each pixel of each of the first quads 120, calculating a signed distance between the relevant pixel and a point on the line segment extending across the relevant first quad that is closest to the relevant pixel 122, reading from the distance buffer a stored signed distance for the relevant pixel 124 and if the signed distance is less than the stored signed distance, writing the signed distance to the distance buffer 126.

The method further comprises, for each pixel of each of the second quads, writing a maximum negative signed distance to the distance buffer 128, rendering the first and second quads to the render buffer 130, reading one or more signed distances from the distance buffer corresponding to the first and second quads 132, using the one or more signed distances to calculate one or more blending factors 134 and using the one or more blending factors to blend the first and second quads in the render buffer thereby rendering the graphical shape 136.

More particularly, referring to FIG. 2(*a*), there is shown an example of a graphical shape 200 that may be rendered using the method 100. The graphical shape 200 is an oval that is titled to one side and comprises a substantially convex outer boundary 202.

The method begins by computing a plurality of curved lines in screen coordinates that correspond to the boundary 202 of a graphical shape 200. Preferably, the curved lines that are computed are Bezier curves and may comprise cubic or quadratic Bezier curves. In the example shown in FIG. 2(*a*), three quadratic Bezier curves have been computed for the boundary 202 which are, accordingly, governed by three vertex control points 204.

A render buffer (not shown) is then computed that has a camera position and width and height dimensions that accord with a final image of the graphical shape 200 that will be rendered using the method 100. A distance buffer (not shown) is also computed that has the same dimensions and camera position as the render buffer.

The curved lines of the shape 200 are then sub-divided in order to form a plurality of monotonic curved lines. For example, the three Bezier curves shown in FIG. 2(*a*), which are governed by the three vertex control points 204, are sub-divided until the curves are governed by three additional vertex control points 206, as shown in FIG. 2(*b*). As a result of this sub-division process, the three Bezier curves are all monotonic and are, collectively, governed by a total of six control point vertices 204,206.

The vertices 204,206 of the monotonic curved lines are then incrementally traversed from top-to-bottom according to their respective Y-axis positions. For example, in FIG. 2(*c*) the vertices 204,206 are traversed in the following order: 204.1, 206.1, 204.2, 204.3, 206.2 and 206.3. For each vertex that is considered during the traversal process, a subjacent vertex that is immediately below the relevant vertex is identified. For example, in FIG. 2(*c*), when the vertex referred to by numeral 206.1 is considered, the subjacent vertex referred to by numeral 204.2 is identified.

For each vertex and corresponding subjacent vertex that is identified during the traversal process, a row 208 is determined that is disposed between the relevant vertex and subjacent vertex. For example, in FIG. 2(*c*), a row 208 that is delimited by top and bottom imaginary lines 210, 212 has been determined for the vertex referred to by numeral 206.1 and corresponding subjacent vertex referred to by numeral 204.2.

For each individual row 208 that is determined, a plurality of first quads 214 are computed for the row 208. Each first quad 214 covers a line segment of one of the monotonic curved lines that extends across the row 208. For example, in FIG. 2(*c*), a pair of first quads 214.1, 214.2 are shown which have been computed for individual row 208. The first of these quads 214.1 covers a line segment 215.1 of the Bezier curve that is governed by vertices 204.1, 206.1 and 204.3 that extends substantially vertically across the row 208. The second of these quads 214.2 covers a line segment 215.2 of the Bezier curve that is governed by vertices 204.1, 204.2 and 206.2 that extends diagonally across the row 208.

One or more second quads 216 are then computed. Each second quad 216 is disposed inside the boundary 202 of the graphical shape 200 and is bounded between a pair of first quads 214. For example, in FIG. 2(*c*) a single second quad 216 has been computed which is disposed inside the boundary 202 of the graphical shape 200 and is bounded between the pair of first quads 214.1, 214.2 that were computed.

Each side of each first quad 214 that faces a second quad 216 is then feathered horizontally by an antialiasing distance so that the relevant quad 214 overlaps the relevant second quad 216 at least in part. For example, in FIG. 3(*a*) it can be seen that the right hand side 218.1 of the left-most first quad 214.1 faces the single second quad 216 that has been computed. Furthermore, the left hand side 218.2 of the right-most first quad 214.2 also faces the second quad 216.

Figure 3A:
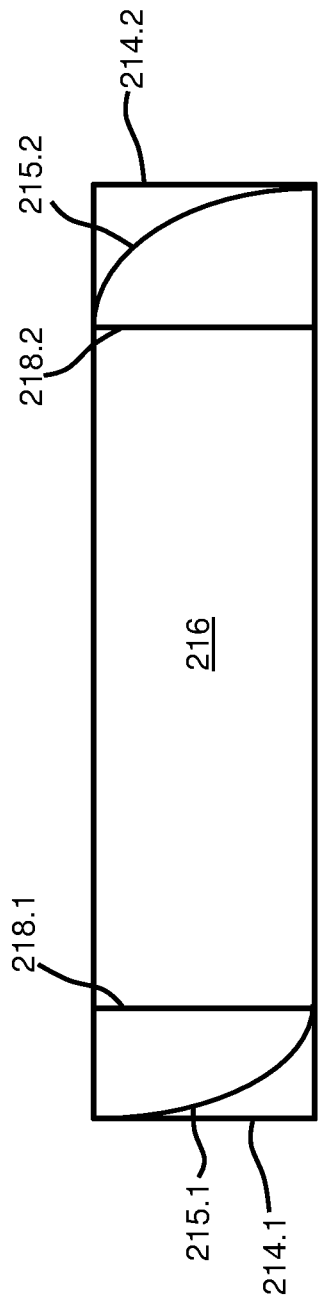
FIGS. 3(a) to 3(c) illustrate further steps comprised in the method.
Figure 3B:
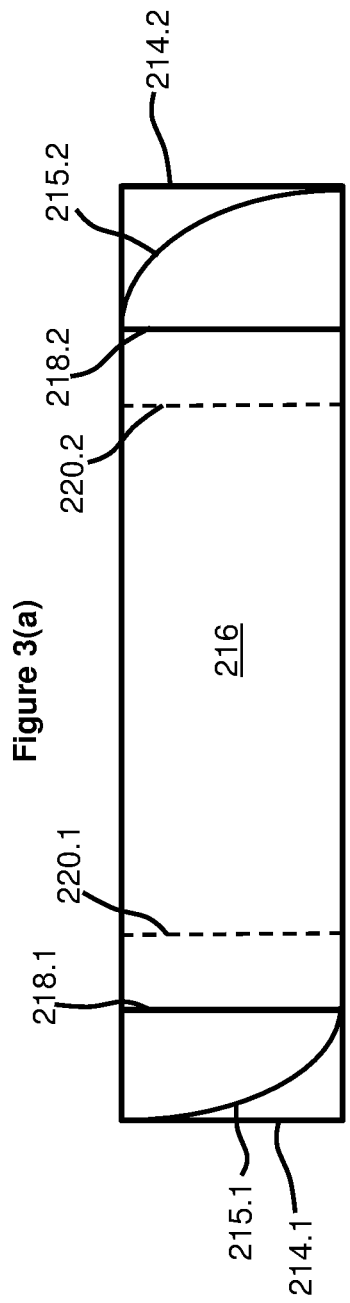
Figure 3C:
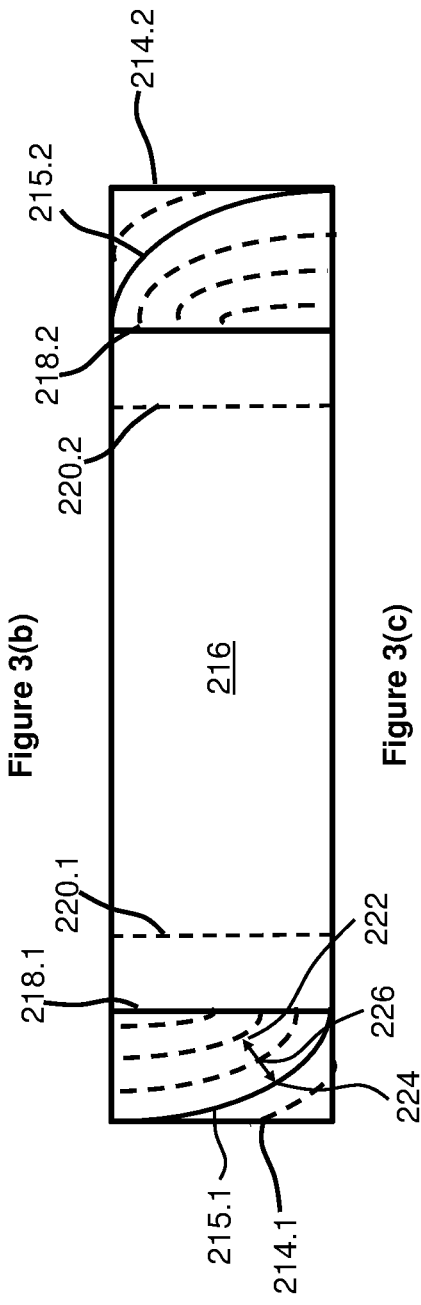

As shown in FIG. 3(*b*), as a result of side 218.1 of first quad 214.1 being feathered by the antialiasing distance, the position of the side 218.1 has been extended horizontally to the new position referred to by 220.1. As a result of side 218.2 of first quad 214.2 being feathered, it has been extended horizontally to the new position referred to by 220.2. The feathering process, therefore, results in the two first quads 214.1, 214.2 overlapping the second quad 216 at least in part.

A sub-procedure is then executed which renders each of the first and second quads 214,216 to the distance buffer that was previously computed.

To perform this sub-procedure, for each pixel of each of the first quads 214, a signed distance between the relevant pixel and a point on the line segment extending across the relevant first quad that is closest to the relevant pixel is calculated. For example, in FIG. 3(*c*) for the pixel of left-most first quad 214.1 referred to by numeral 222, the point on the line segment 215.1 extending across the quad 214.1 that is closest to the pixel 222 is referred to by numeral 224. Accordingly, the signed distance that is calculated is shown by numeral 226.

In examples of the method where the boundary 202 of the graphical shape 200 has been calculated using quadratic Bezier curves, each signed distance that is calculated for each pixel of each quad 214,216 may be calculated using a sigmoid shaped curve.

After each individual signed distance is calculated, a lookup operation is performed using the distance buffer to see whether or not an existing signed distance has previously been stored in the distance buffer for the relevant screen-coordinate pixel position. If an existing signed distance has not been stored, then the signed distance that has been calculated is simply written into the buffer at the relevant screen-coordinate pixel position. If, however, an existing signed distance has been stored, then the signed distance is only written into the distance buffer if its value is less than the existing signed distance.

To render the second quads 216 into the distance buffer, no lookup operation is performed. Instead, a maximum negative signed distance is simply written directly into the distance buffer for each pixel of each second quad 216.

Figure 4:
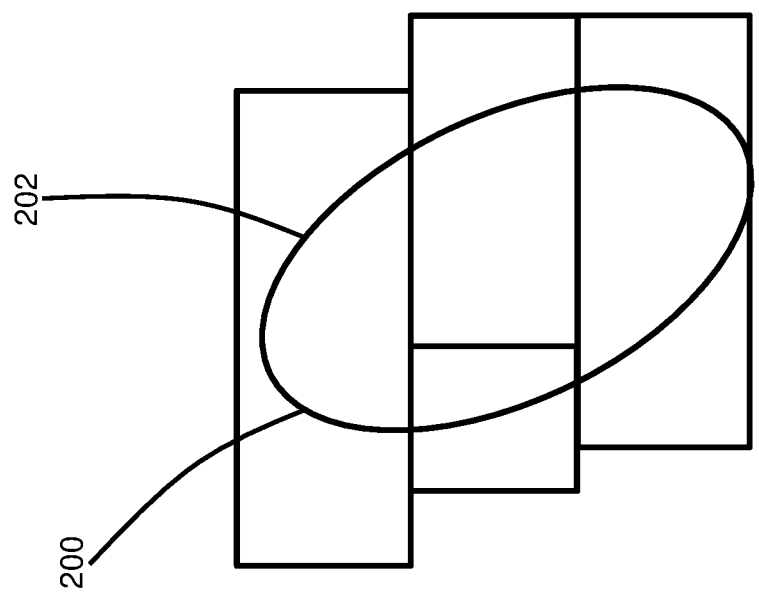
FIG. 4 illustrates a further step comprised in the method.
Figure 5:
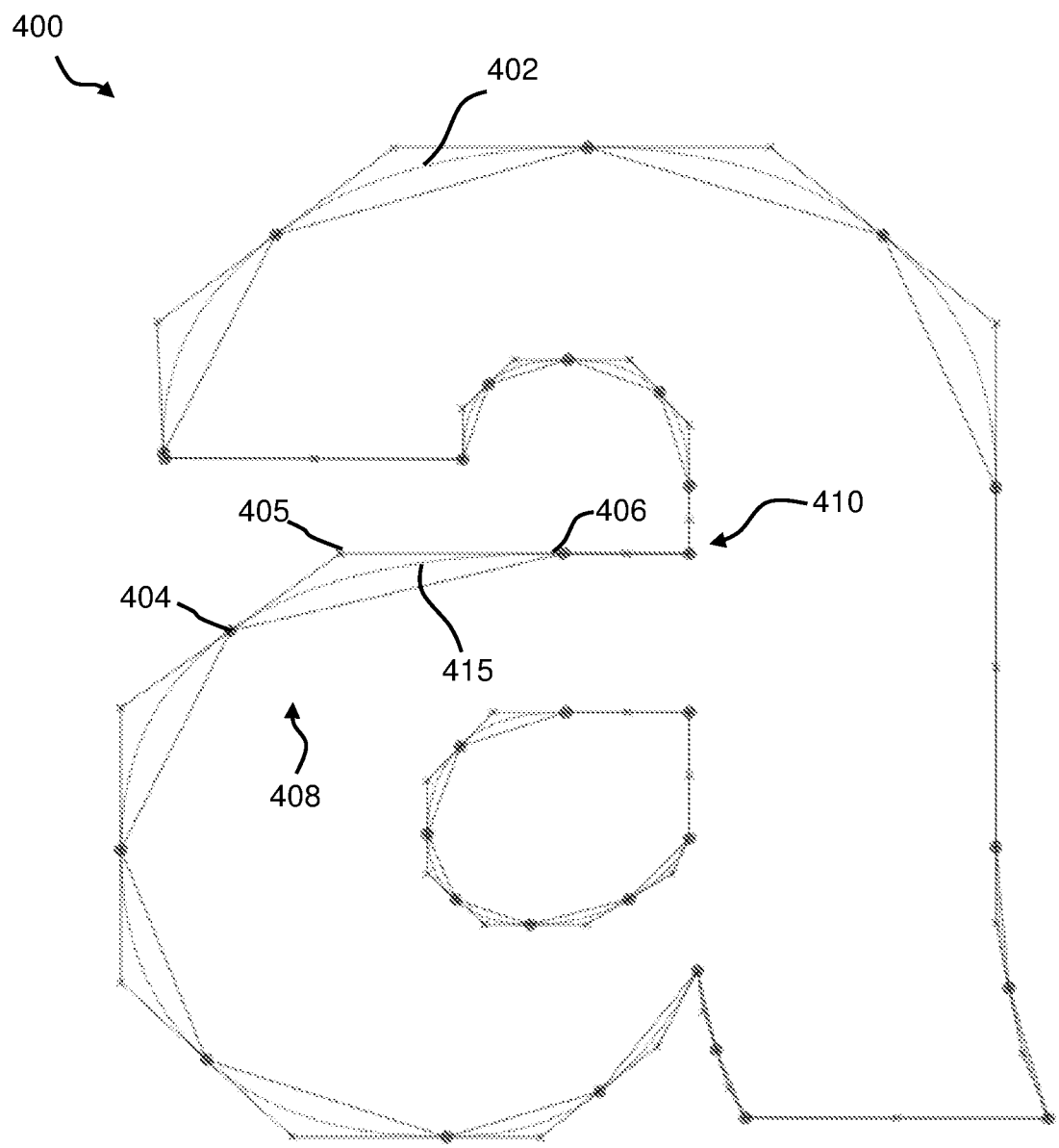
FIGS. 5 to 9 illustrates steps comprised in a method according to another example embodiment of the invention.

A final sub-procedure is then executed which renders the graphical shape 200 into a format configured for display on a computer visual device. To perform the sub-procedure, the first and second quads 214, 216 are firstly rendered to the render buffer that was previously computed. One or more signed distances corresponding to the first and second quads 214,216 are then read from the distance buffer. These signed distances are then used to calculate one or more blending factors. The blending factors and finally then used to blend the first and second quads 214, 216 in the render buffer thereby rendering the graphical shape, as shown in FIG. 4.

Referring to FIGS. 5 to 9, there is shown an example application of a method to render a graphical shape 400. The graphical shape 400 is a font glyph for a lower case "a" comprising a curved and linear boundary 402. The boundary 402 is calculated and represented by a series of quadratic Bezier, curves, each quadratic Bezier curve forming a line segment 415. Each quadratic Bezier curve is governed by three control coordinates, namely a start point 404, an intermediate point 405, and an end point 406. The end point of one Bezier curve is the start point of the next Bezier curve.

For each quadratic Bezier curve, a triangle 408 containing line segment 415 is formed by connecting the start point 404, the intermediate point 405 and the end point 406. Notably, however, where a quadratic Bezier curve represents a straight line 410, the connected control coordinates does not form a triangle, but again forms the straight line 410.

Figure 6:
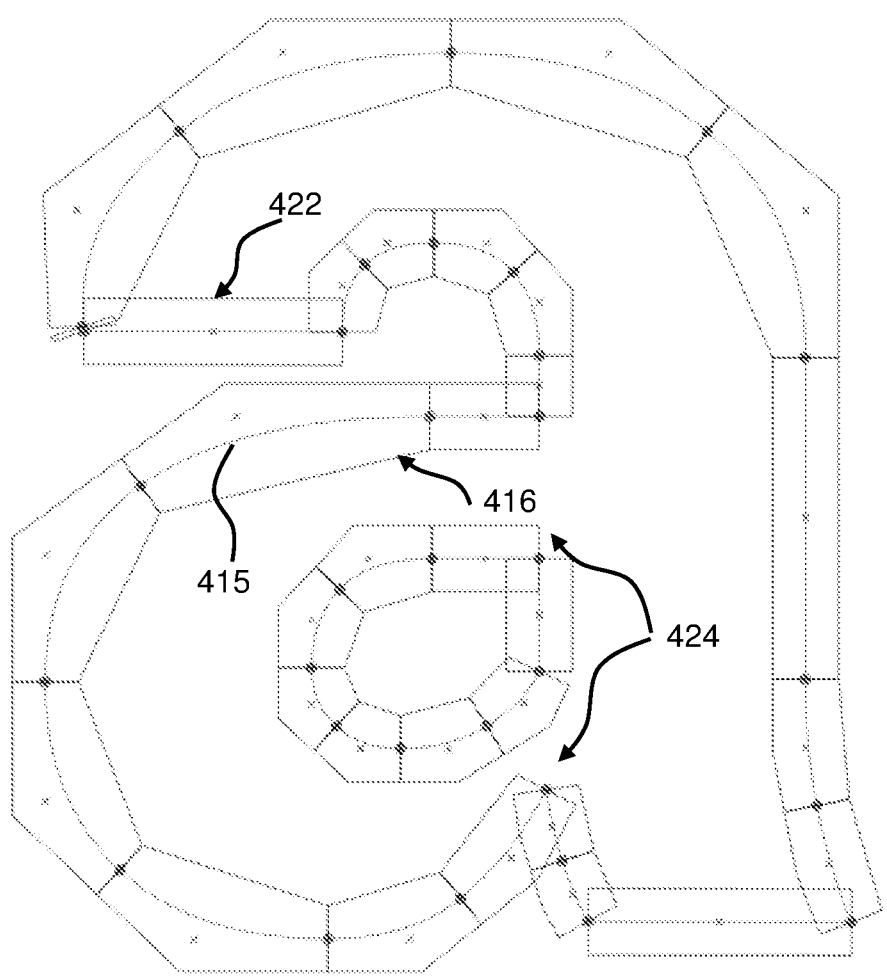

Referring now to FIG. 6, for each line segment 415, a polygon is formed by extruding each triangle or straight line by an antialiasing distance. Triangles are extruded to form pentagons 416 and lines are extruded to form rectangles 418. After extrusion, each line segment 415 is contained within a pentagon 416 or a rectangle 422. During extrusion the line connecting the start point and the end point is moved perpendicularly away from the line segment 415 by half the antialiasing distance on one side of the line segment 415. Further the combination of lines connecting each of the start point 404 and end point 406 to the intermediate point 405 is moved perpendicularly away from the line segment 415 by half the antialiasing distance on the other side of the line segment 415. Accordingly both the start point 404 and end point 406 changes from a connection point of triangle 408 to an intersection between the line segment 415 and a perpendicular line having a length equal to the antialiasing distance, the perpendicular line forming a side of the polygon.

Figure 7:
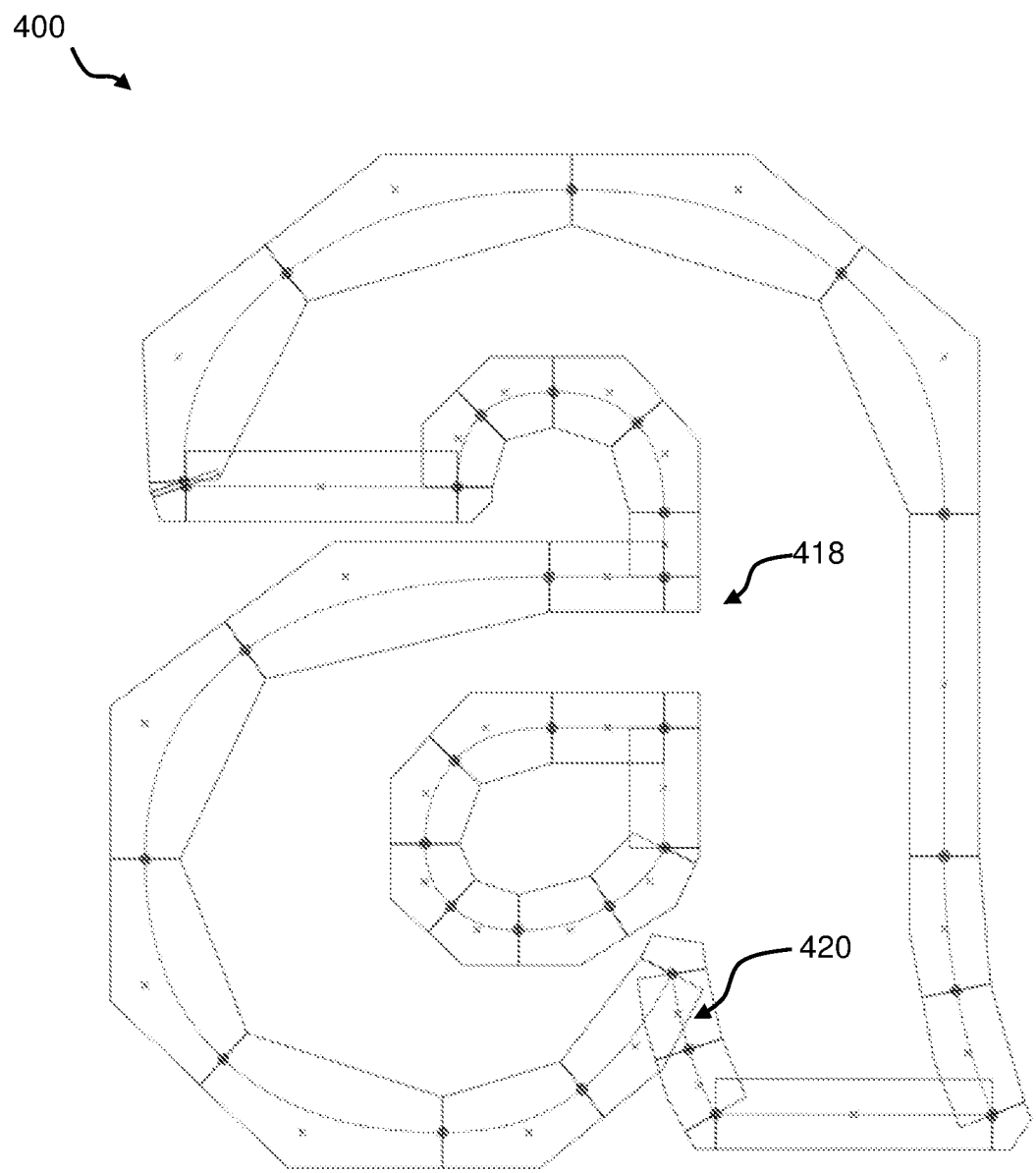

After extrusion, where adjacent line segments 415 intersect at corners, certain vacant areas 424 within the antialiasing distance from the boundary 402 are not contained within a polygon. With reference to FIG. 7, for example, filler polygons 418 are computed using the extruded distance, to cover these areas. The extruded distance may be half the antialiasing distance.

Figure 8:
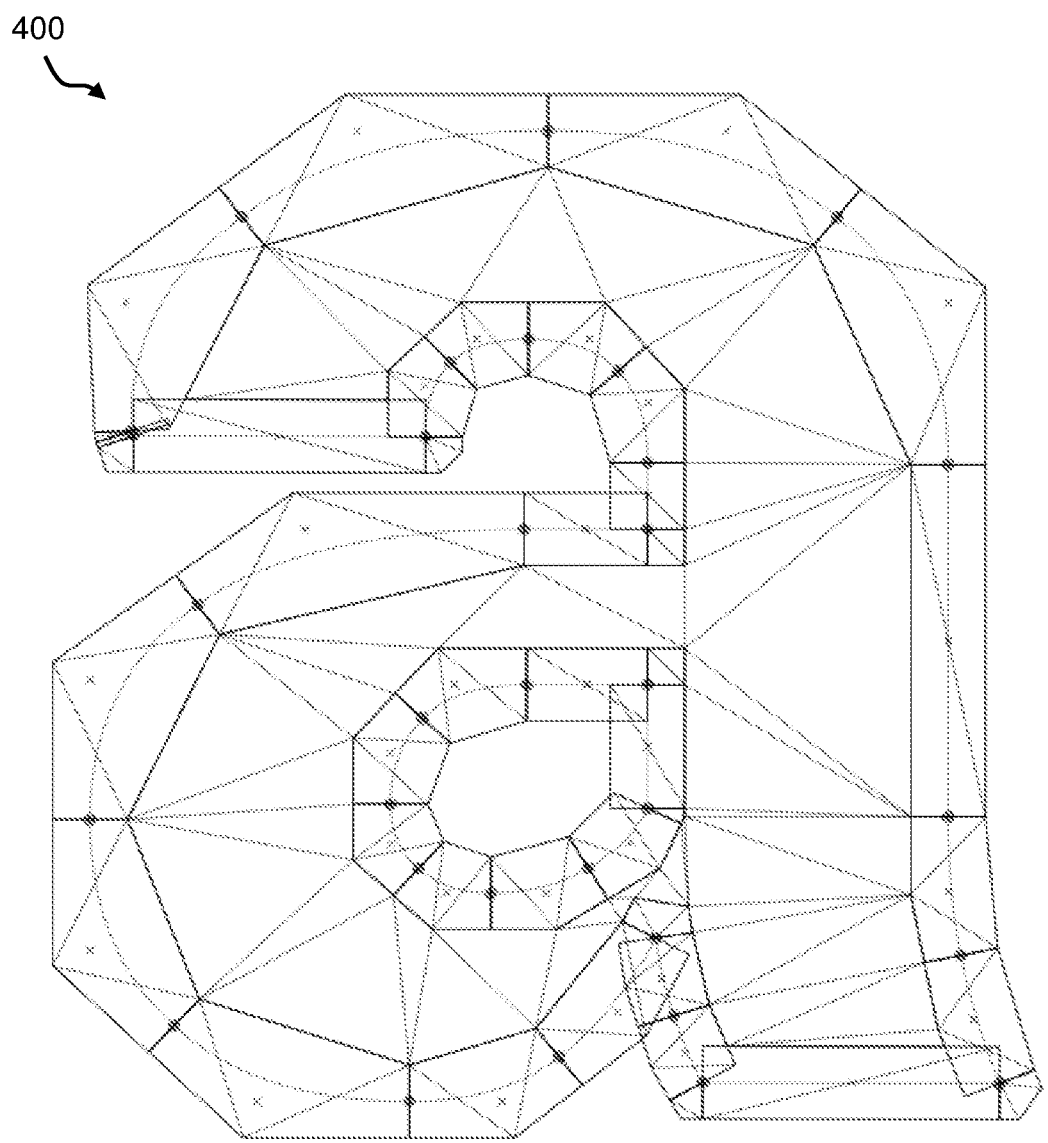
Figure 9:
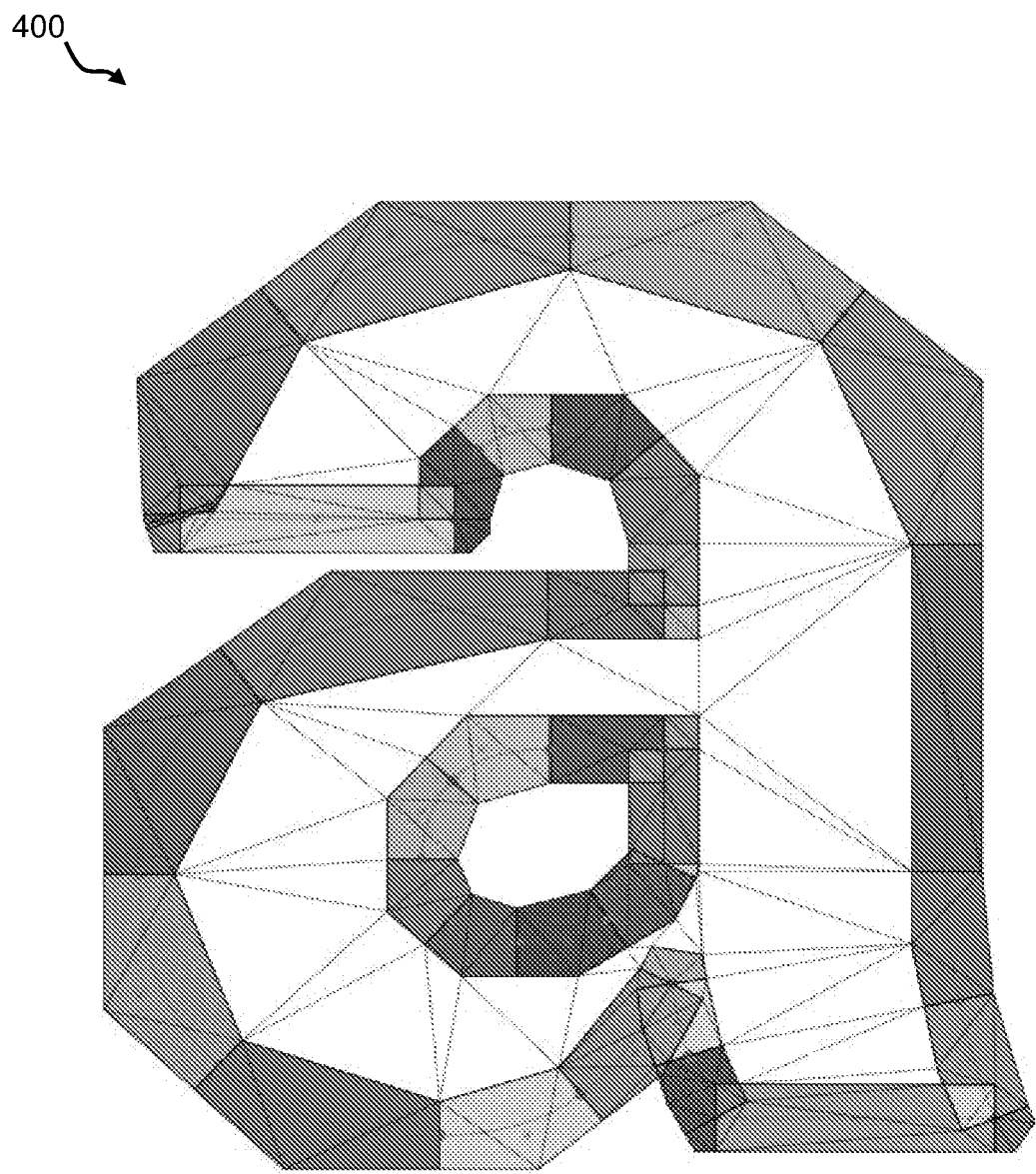

Referring to FIGS. 7 to 9, extruded polygons may overlap. In one embodiment, as shown for example in FIG. 9, overlapping polygons may be identified and isolated to form isolated polygons 420. These polygons may be linked to multiple line segments 415. Linked polygons may be rendered directly to the frame buffer without using a separate signed distance buffer. Polygons that refer to multiple line segments may be rendered with a fragment shader that iterates over each curve and calculates the smallest absolute signed distance. Each polygon, as well as the internal area may be triangulated, as shown for example in FIG. 8.

The method 100 may, advantageously, be executed on a graphics processor unity (GPU) in real-time. The method 10 is, in particular, well suited for commercially-available graphics cards having GPUs that operate on multiple screen pixels in parallel. The method 10 further enables vector-based three-dimensional graphics to be rendered efficiently and accurately at any particular screen resolution.

The method 100 may also be used to render a plurality of graphical shapes. For example, in one example embodiment, the method further comprises computing a plurality of distance buffers corresponding to the plurality of graphical shapes and iterating through the graphical shapes in z-order (i.e., from the shapes that are nearest to the scene camera towards the shapes that are furthest away from the scene camera). During this iteration procedure, the graphical shapes are assigned to the distance buffers so that each distance buffer only comprises graphical shapes that (a) do not overlap, or (b) overlap but comprise a common fill shader. The graphical shapes may then each be individually rendered to the render buffer using the steps described above for an individual graphical shape.

When a set of overlapping shapes are assigned to a common distance buffer during the iteration procedure, a geometric operation may be performed on the overlapping shapes so that only a single combined shape is subsequently rendered to the relevant distance and render buffers. The geometric operation that is used may, for example, comprise a union operation. Alternatively, the geometric operation may comprise an intersection operation.

Embodiments of the present invention provide rendering methods that are useful for displaying graphical shapes on computer visual displays.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. A method comprising:
computing a plurality of curved lines in screen coordinates, wherein the curved lines correspond to a boundary of a graphical shape;
computing a distance buffer and a render buffer, wherein the buffers have identical dimensions and an identical camera position;
subdividing the curved lines to form a plurality of monotonic curved lines; for each vertex of the monotonic curved lines:
    determining a subjacent vertex of the monotonic curved lines that is immediately below the relevant vertex;
    determining a row disposed between the relevant vertex and the subjacent vertex;
    computing a plurality of first quads, wherein each of the first quads covers a line segment of one of the monotonic curved lines that extends across the row;
    computing one or more second quads, wherein each of the second quads is disposed inside the boundary of the graphical shape and between a pair of the first quads; and horizontally feathering each side of each of the first quads by an antialiasing distance, wherein the relevant side faces one of the second quads;
for each pixel of each of the first quads:
calculating a signed distance between the relevant pixel and a point on the line segment extending across the relevant first quad that is closest to the relevant pixel;
reading from the distance buffer a stored signed distance for the relevant pixel; and
if the signed distance is less than the stored signed distance, writing the signed distance to the distance buffer;
for each pixel of each of the second quads, writing a maximum negative signed distance to the distance buffer;
rendering the first and second quads to the render buffer;
reading one or more signed distances from the distance buffer corresponding to the first and second quads;
using the one or more signed distances to calculate one or more blending factors; and
using the one or more blending factors to blend the first and second quads in the render buffer thereby rendering the graphical shape.

2. The method according to claim 1, further comprising:
computing a plurality of distance buffers corresponding to a plurality of graphical shapes;
iterating through the graphical shapes in z-order;
assigning the graphical shapes to the distance buffers so that each of the distance buffers only comprises graphical shapes that:
do not overlap; or
overlap and comprise a common fill shader; and
rendering the graphical shapes to the render buffer.

3. The method according to claim 2, further comprising performing a geometric operation on each set of overlapping graphical shapes before assigning the set of overlapping graphical shapes to the relevant distance buffer.

4. The method according to claim 3, wherein the geometric operation comprises a union operation.

5. The method according to claim 3, wherein the geometric operation comprises an intersection operation.

6. The method according to claim 1, wherein the curved lines comprise Bezier curves.

7. The method according to claim 6, wherein the curved lines comprise cubic Bezier curves.

8. The method according to claim 6, wherein the curved lines comprise quadratic Bezier curves.

9. The method according to claim 8, wherein the signed distances that are calculated for the first quads are calculated using a cubic equation.

10. The method according to claim 1, wherein the one or more blending factors are calculated using a sigmoid shaped curve.

11. The method according to claim 1, wherein the method is executed on a graphics processor unit.

12. The method according to claim 1, wherein the method is executed in real-time.

13. The method according to claim 12, wherein the method is executed in real-time on a graphics processor unit.

14. A system for rendering a graphical shape, the system comprising a graphics processor unit configured to:
compute a plurality of curved lines in screen coordinates, wherein the curved lines correspond to a boundary of a graphical shape;
compute a distance buffer and a render buffer, wherein the buffers have identical dimensions and an identical camera position;
subdivide the curved lines to form a plurality of monotonic curved lines; for each vertex of the monotonic curved lines:
determine a subjacent vertex of the monotonic curved lines that is immediately below the relevant vertex;
determine a row disposed between the relevant vertex and the subjacent vertex;
compute a plurality of first quads, wherein each of the first quads covers a line segment of one of the monotonic curved lines that extends across the row;
compute one or more second quads, wherein each of the second quads is disposed inside the boundary of the graphical shape and between a pair of the first quads; and
horizontally feather each side of each of the first quads by an antialiasing distance, wherein the relevant side faces one of the second quads;
for each pixel of each of the first quads:
calculate a signed distance between the relevant pixel and a point on the line segment extending across the relevant first quad that is closest to the relevant pixel;
read from the distance buffer a stored signed distance for the relevant pixel; and
if the signed distance is less than the stored signed distance, write the signed distance to the distance buffer;
for each pixel of each of the second quads, write a maximum negative signed distance to the distance buffer;
render the first and second quads to the render buffer;
read one or more signed distances from the distance buffer corresponding to the first and second quads;
use the one or more signed distances to calculate one or more blending factors; and
use the one or more blending factors to blend the first and second quads in the render buffer thereby rendering the graphical shape.

15. A computer-readable medium storing computer-executable instructions, comprising:
computing a plurality of curved lines in screen coordinates, wherein the curved lines correspond to a boundary of a graphical shape;
computing a distance buffer and a render buffer, wherein the buffers have identical dimensions and an identical camera position;
subdividing the curved lines to form a plurality of monotonic curved lines; for each vertex of the monotonic curved lines:
determining a subjacent vertex of the monotonic curved lines that is immediately below the relevant vertex;
determining a row disposed between the relevant vertex and the subjacent vertex;
computing a plurality of first quads, wherein each of the first quads covers a line segment of one of the monotonic curved lines that extends across the row;
computing one or more second quads, wherein each of the second quads is disposed inside the boundary of the graphical shape and between a pair of the first quads; and
horizontally feathering each side of each of the first quads by an antialiasing distance, wherein the relevant side faces one of the second quads;
for each pixel of each of the first quads:
calculating a signed distance between the relevant pixel and a point on the line segment extending across the relevant first quad that is closest to the relevant pixel;

reading from the distance buffer a stored signed distance for the relevant pixel; and if the signed distance is less than the stored signed distance, writing the signed distance to the distance buffer;

for each pixel of each of the second quads, writing a maximum negative signed distance to the distance buffer;

rendering the first and second quads to the render buffer;

reading one or more signed distances from the distance buffer corresponding to the first and second quads;

using the one or more signed distances to calculate one or more blending factors; and using the one or more blending factors to blend the first and second quads in the render buffer thereby rendering the graphical shape.

* * * * *